United States Patent
Ji et al.

(10) Patent No.: US 7,974,344 B2
(45) Date of Patent: Jul. 5, 2011

(54) METHOD FOR OBTAINING IMAGE REFERENCE BLOCK IN A CODE OF MODE OF FIXED REFERENCE FRAME NUMBER

(75) Inventors: Xiangyang Ji, Beijing (CN); Wen Gao, Beijing (CN); Siwei Ma, Beijing (CN); Debin Zhao, Beijing (CN); Yan Lu, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 735 days.

(21) Appl. No.: 10/584,777

(22) PCT Filed: Jul. 8, 2004

(86) PCT No.: PCT/CN2004/000770
§ 371 (c)(1),
(2), (4) Date: Jun. 5, 2009

(87) PCT Pub. No.: WO2005/067298
PCT Pub. Date: Jul. 21, 2005

(65) Prior Publication Data
US 2009/0304083 A1    Dec. 10, 2009

(30) Foreign Application Priority Data

Dec. 31, 2003   (CN) .......................... 2003 1 0116090

(51) Int. Cl.
*H04N 7/12* (2006.01)
(52) U.S. Cl. .................................................. 375/240.16
(58) Field of Classification Search .............. 375/240.16
See application file for complete search history.

(56) References Cited

FOREIGN PATENT DOCUMENTS

| | | |
|---|---|---|
| CN | 1449197 A | 10/2003 |
| CN | 1450812 A | 10/2003 |
| WO | 01/33864 A1 | 5/2001 |

*Primary Examiner* — Jayanti K Patel
*Assistant Examiner* — Richard Torrente
(74) *Attorney, Agent, or Firm* — J.C. Patents

(57) ABSTRACT

A "rounding to zero" method can maintain the exact motion vector and can also be achieved by the method without division so as to improve the precision of calculating the motion vector, embody the motion of the object in video more factually, and obtain the more accurate motion vector prediction. Combining with the forward prediction coding and the backward prediction coding, the present invention realizes a new prediction coding mode, which can guarantee the high efficiency of coding in direct mode as well as is convenient for hardware realization, and gains the same effect as the conventional B frame coding.

7 Claims, 2 Drawing Sheets

METHOD FOR OBTAINING IMAGE REFERENCE BLOCK IN A CODE OF MODE OF FIXED REFERENCE FRAME NUMBER

FIELD OF THE INVENTION

The present invention relates to a method of determining a reference image block for video coding, and more particularly to a method of determining a reference image block in direct coding mode, which belongs to image and video coding/decoding technical field.

BACKGROUND OF THE INVENTION

High-efficient video coding/decoding technology is the key of realizing storing and transmitting multimedia data at high quality and low cost. The present popular international standards for images coding are based on this coding theory which adopts coding method combining motion compensation based on block matching, discrete cosine transform and quantization. Typically, the first joint technology committee of international standards organization/International Electrotechnical Commission (ISO/IEC JTC1) proposes motion picture experts group (namely to MPEG-1, MPEG-2, MPEG-4 and such international standards; and the International Telecom Union (ITU-T) proposes the H.26x series. These video coding standards are widely used in the industries.

All these standards for video coding adopt Hybrid Video Coding strategy, normally including four main modules such as predicting, transforming, quantizing, information entropy coding etc. wherein, the main function of predicting module is to predict the current image to be coded by using the coded and reconstructed image, namely inter prediction, or to predict the current image part to be coded by using the coded and reconstructed image part in images, namely intra prediction.

The main function of the prediction based on motion compensation is to reduce redundancy of video series on time. Most coding efficiency for video comes from the predicting module. The procedure of the video coding is to code each frame image of video series. The conventional video coding system which codes each frame image is based on macro block as a basic unit. When encoding the current macro block, the motion vector is involved in connecting the current macro block with the reference image block. When encoding each frame image, there are different situations which can be divided into intra coding (I frame), Prediction coding (P frame), bi-directional prediction (B frame) coding etc. Generally, when coding, I frame, P frame and B frame coding are interlarded, for example based on IBBPBBP sequence.

The B frame technology needs to process forward and backward motion estimation at the same time, so that higher computation complexity is needed. And in order to discriminate the forward motion vector from the backward motion vector, the additional flag information is needed to be introduced into. While using the direct coding mode, the forward and backward motion vectors are deduced from the motion vector having backward reference picture, and the motion vectors information might not be encoded. Therefore the bits for encoding the motion vectors information can be decreased and the coding efficiency can be effectively improved.

The deduction of the motion vectors under the direct mode in the prior art is realized as follows:

$MV_F = td/tp \times MV$ $MV_B = (tb-tp)/tp \times MV$ $MV_F$ and $MV_B$ respectively denote the forward motion vector and the backward motion vector corresponding to the current block. Here, tb denotes the distance in time domain between the current picture and the forward reference picture. td denotes the distance in time domain between the forward reference picture and the backward reference picture. MV denotes the motion vector of the corresponding part of the backward reference picture relative to the forward reference frame.

It can be figured out from the above formula that the values of $MV_F$ and $MV_B$ may not be integers. If the motion vector has decimal fraction, the matching block pointed by the motion vector can not be found in the reference picture because the motion vector is based on the pixel as a unit. Therefore, the calculation values of the $MV_F$ and $MV_B$ should be processed to be decided as integral motion vectors.

For instance, in the H.264/AVC, direct mode motion vectors $MV_F$ and $MV_B$ are calculated by the following formulas:

$Z=(tb \times 256)/tp$ $W=Z-256$ $MV_F=(Z \times MV+128)>>8$ $MV_B=(W \times MV+128)>>8$ Where ">>8" denotes right shift 8 bits.

However, the prediction block of the current block still can not be precisely obtained by this rounding method so that bias appear to the image block pointed by the obtained motion vector, which seriously influences the accuracy of deduction of the motion vectors in direct mode, while the direct mode often occupies 70%-80% in the modes used by the B frame so that the compression efficiency of B frame is greatly lowered. Therefore, how to determine motion vectors in direct mode becomes a problem in the video compression field.

SUMMARY OF THE INVENTION

A technical problem solved by the present invention is to provide a method for determining a motion vector in video coding under a direct mode which can more accurately predict motion vectors and improve the compression efficiency.

The technical solution disclosed by the present invention comprises:

(1) obtaining a motion vector in a backward reference frame of a B frame with respect to a current image block;

(2) obtaining a motion vector MV(x,y) for direct coding a current B frame image block in accordance with the obtained motion vector of a corresponding image block in the backward reference frame, and calculating a forward motion vector $MV_F$ of the current block by using the following formulas:

assuming scale_factor=$2^{shift\_len}$, td=tp−tb;

if $mv(i)<0$:

$MVF(i)=-(((scale\_factor/tp) \times (1-mv(i) \times tb)-1)$
$>>shift\_len)$ else, $MVF(i)=((scale\_factor/tp) \times (1+mv(i) \times tb)-1)$
$>>shift\_len)$ calculating a forward motion vector $MV_F$ of the current block by using the following formulas:

if $mv(i)<0$:

$MV_B(i)=((scale\_factor/tp) \times (1-mv(i) \times td)-1)$
$>>shift\_len$ else, $$MV_B(i)=-(((\text{scale\_factor}/tp)\times(1+mv(i)\times td)-1)$$
$$>>\text{shift\_len})$$

where the scale_factor value is a decimal fraction amplification factor; the shift_len denotes times for right shift; $MV_F$ and $MV_B$ denote a forward motion vector and a backward motion vector corresponding to the current block; tb is a distance in time domain between a current picture and a forward reference picture; td denotes a distance in time domain between a forward reference picture and a backward reference picture;

MV denotes a motion vector of the corresponding part of the backward reference picture with respect to a forward reference frame;

MV(x,y)=(MV(x), MV(y)) is a two-dimensional vector, of which the corresponding components are MV(x), MV(y);

MV(i) denotes MV(x) or MV(y) and a/b denotes integering a quotient of a and b towards zero;

(3) the forward and backward image block pointed by the motion vector obtained from step (2) acting as a reference image block of the current image block.

The "(1±mv(i)×tb)−1" in above formulas can be changed to be "1±mv(i)×tb", the result will not be changed much. However, in general, the coding efficiency will be better by using "(1±mv(i)×tb)−1".

The present invention discloses a "rounding to zero" method which can maintain the exact motion vector and can also be achieved by the method without division so as to improve the precision of calculating the motion vector, embody the motion of the object in video more factually, and obtain the more accurate motion vector prediction. Combining with the forward prediction coding and the backward prediction coding, the present invention realizes a new prediction coding mode, which can guarantee the high efficiency of coding in direct mode as well as is convenient for hardware realization, and gains the same effect as the conventional B frame coding.

DETAILED DESCRIPTION OF THE PREFERRED EMBODIMENTS

The solution provided by the present invention will be better understood from following, detailed description of preferred embodiments of the invention with reference to the drawings.

Figure 1:
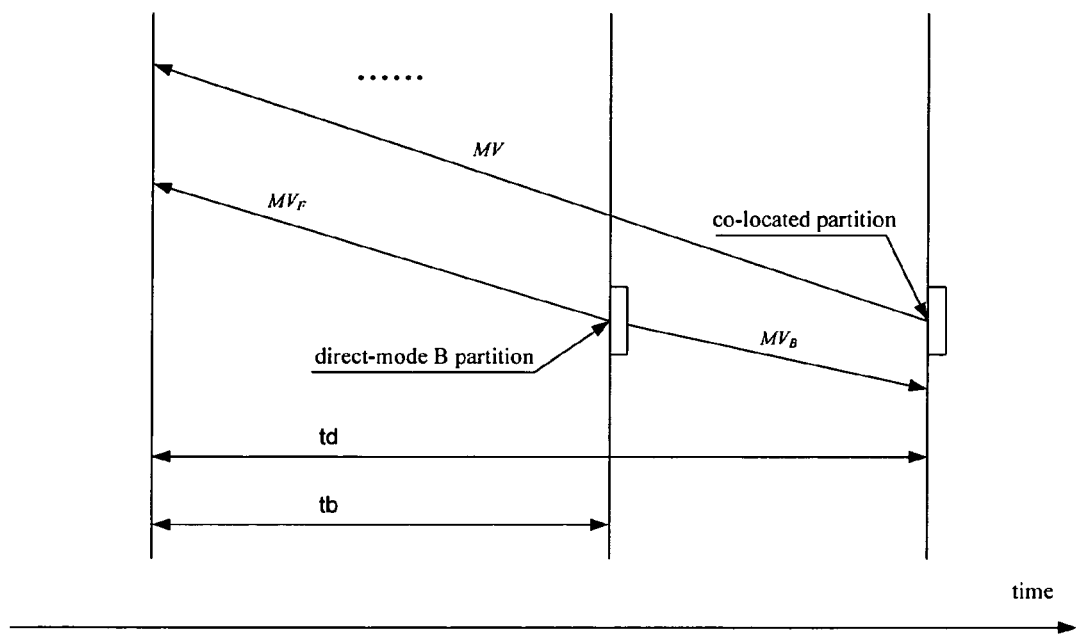
FIG. 1 is a sketch drawing showing the application under the Direct mode of the present invention.

FIG. 1 is a sketch drawing showing the application of the present invention, in which the deduction of the motion vector in the direct mode is represented. Here, tb is a distance in time domain between a current picture and a forward reference picture; and td denotes a distance in time domain between the forward reference picture and a backward reference picture. Firstly, some definition used in the description is given:

a/b denotes integering a quotient of a and b towards zero, e.g. 15/7=2, −15/7=−2; MV(x,y)=(MV(x), MV(y)) is a two-dimensional vector, of which the corresponding components are MV(x), MV(y), and MV(i) denotes MV(x) or MV(y).

Figure 2:
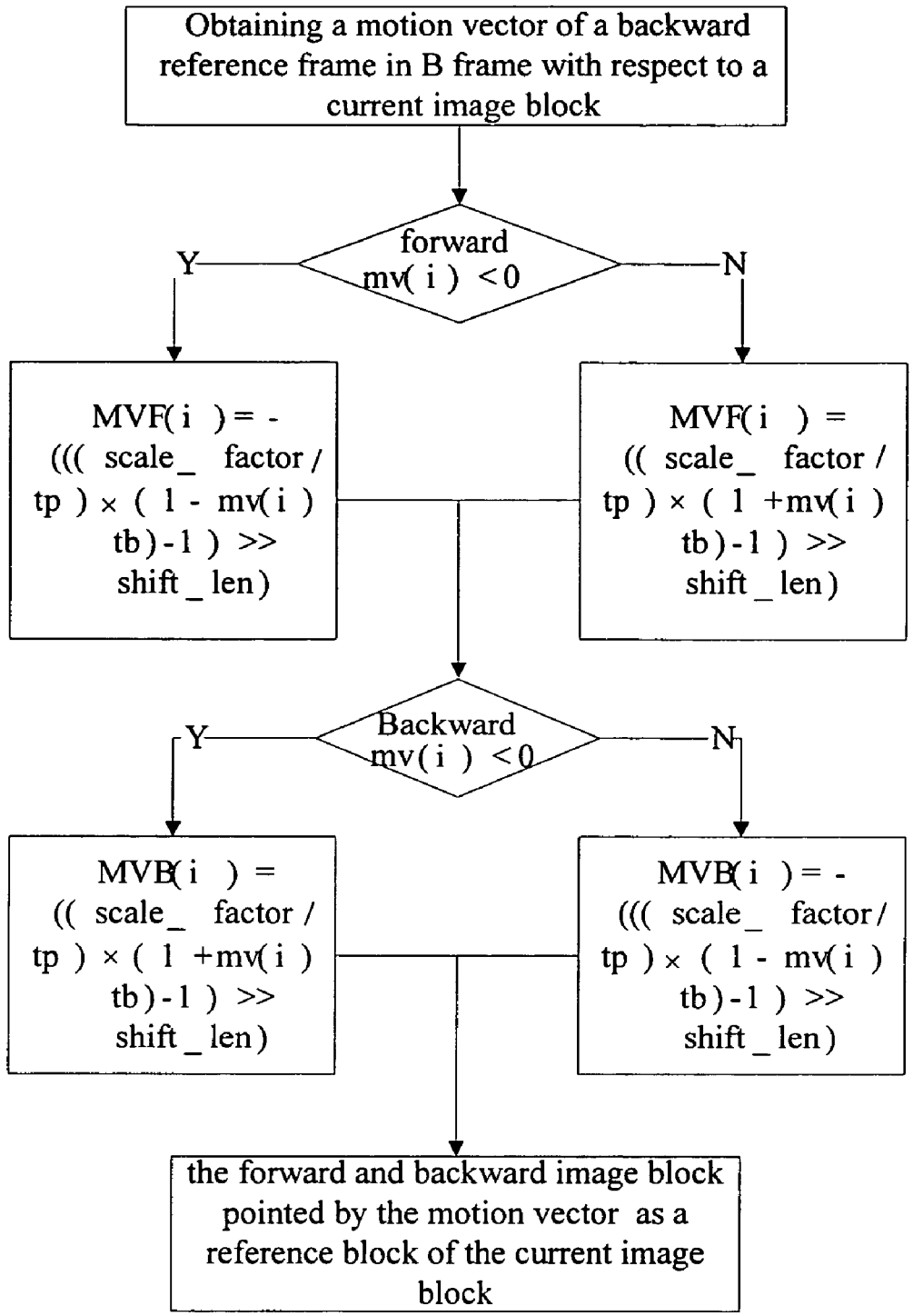
FIG. 2 is a flowchart of the technical solution in the present invention.

As shown FIG. 2, in the direct mode at the coding end, determining the forward and backward reference image blocks in B frame comprises the steps of:

(1) obtaining a motion vector in a backward reference frame of a B frame with respect to a current image block;
(2) obtaining a motion vector MV(x,y) for direct coding a current B frame image block in accordance with the obtained motion vector of a corresponding image block in the backward reference frame, and calculating a forward motion vector $MV_F$ of the current block by using the following formulas:

assuming scale_factor=$2^{shift\_len}$, td=tp−tb;

if $mv(i)<0$:

$$MV_F(i)=-(((\text{scale\_factor}/tp)\times(1-mv(i)\times tb)-1)$$
$$>>\text{shift\_len})$$

else, $$MV_F(i)=((\text{scale\_factor}/tp)\times(1+mv(i)\times tb)-1)$$
$$>>\text{shift\_len})$$

calculating a forward motion vector $MV_B$ of the current block by using the following formulas:

if $mv(i)<0$:

$$MV_B(i)=((\text{scale\_factor}/tp)\times(1-mv(i)\times td)-1)$$
$$>>\text{shift\_len}$$

else, $$MV_B(i)=-(((\text{scale\_factor}/tp)\times(1+mv(i)\times td)-1)$$
$$>>\text{shift\_len})$$

where the scale_factor value is a decimal fraction amplification factor; scale_factor=$2^{shift\_len}$, the shift_len is a natural number denoting times for right shift; the bigger the scale_factor value is, the more exactly the calculation result in the formula can be maintained;

(3) the forward and backward image block pointed by the motion vector obtained from step (2) acting as a reference image block of the current image block.

For the scale_factor is an amplification factor, in order to avoid division, the dividend can be firstly amplified and be right shifted to decrease loss of the precision, which is the theme of the present invention.

The values of tp and tb have a limited scope, for example, generally tp and tb will not be larger than 10 so that the scale_factor/tp, tb×scale_factor/tp, td/tp×scale_factor can be pre-calculated to form a list. When it is needed by calculating, read the needed values from the list directly to decrease the computation complexity and improve the computation velocity.

The "tb×scale_factor/tp×mv(i)−1" in the above formulas can be changed to be "tb×scale_factor/tp×mv(i)−1", the result will not be changed much. However, in general, the coding efficiency will be better by using "tb×scale_factor/tp×mv(i)−1".

Meantime, for td=tp−tb, the deduction of the backward motion vector can be further simplified as follows when needed:
calculating a forward motion vector $MV_F$ of the current block by using the following formulas:

assuming scale_factor=$2^{shift\_len}$, if $mv(i)<0$:

$$MV_F(i)=-(((\text{scale\_factor}/tp)-(tb\times\text{scale\_factor}/tp)\times mv(i))>>\text{shift\_len})$$

else, $$MV_F(i)=((\text{scale\_factor}/tp)+(tb \times \text{scale\_factor}/tp) \times mv(i)) >> \text{shift\_len}$$

calculating a backward motion vector $MV_B$ of the current block by using the following formulas:

if $mv(i)<0$:

$$MV_B(i)=((\text{scale\_factor}/tp)-(td \times \text{scale\_factor}/tp) \times mv(i)) >> \text{shift\_len}$$

else, $$MV_B(i)=-(((\text{scale\_factor}/tp)+(td \text{scale\_factor}/tp) \times mv(i)) >> \text{shift\_len})$$

The "(1±mv(i)×tb)−1" in above formulas can be changed to be "1±mv(i)×tb", the result will not be changed much. However, in general, the coding efficiency will be better by using (1±mv(i)×tb)−1.

The following will further describe the technical solution disclosed by the present invention through an embodiment: when tb=1, td=2, MV=(5, −7), then tp=3 in H.264/AVC, $$Z=(tb \times 256)/tp=85$$

$$W=Z-256=-171$$

$$MV_F(x)=(Z \times MV(x)+128)>>8=(Z \times 5+128)>>8=2;$$

$$MV_B(x)=(W \times MV(x)+128)>>8=(W \times 5+128)>>8=-3;$$

$$MV_F(y)=(Z \times MV(y)+128)>>8=(Z \times -7+128)>>8=2;$$

$$MV_B(y)=(W \times MV(y)+128)>>8=(W \times -7+128)>>8=5;$$

by using the method provided by the present invention, here scale_factor=256, then shift_len=8;
for the forward motion vector:

because $mv(x)=5>0$, $$MV_F(x)=((256/3)+(1 \times 256/3) \times 5)>>8=1$$

because $mv(y)=-7<0$ $$MV_F(y)=-(((256/3)-(1 \times 256/3) \times -7)>>8)=-2$$

for the backward motion vector:

because $mv(x)=5>0$ $$MV_B(x)=-(((256/3)+(2 \times 256/3) \times 5)>>8)=-3$$

because $mv(y)=-7<0$ $$MV_B(y)=((256/3)-(2 \times 256/3) \times -7)>>8=4.$$

There is available bigger time domain relativity between the adjacent pictures of the video series in time domain, and the motion of the objects is mostly kept at uniform velocity and smaller offset translation motion between the adjacent pictures, so the present invention uses the above approach to reduce as much as the influence of the motion vector deduction caused by rounding error to gain better prediction reference image block.

It should be understood that the above embodiments are used only to explain, but not to limit the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method used by a hardware apparatus for determining a reference image block in direct coding mode, comprising the steps of:
   (1) obtaining a motion vector in a backward reference frame of a B frame with respect to a current image block;
   (2) obtaining a motion vector MV(x,y) for direct coding a current B frame image block in accordance with the obtained motion vector of a corresponding image block in the backward reference frame,
   calculating a forward motion vector $MV_F$ of the current block by using the following formulas:

assuming scale_factor=$2^{shift\_len}$, $td=tp-tb$;

if $mv(i)<0$:

$$MV_F(i)=-(((\text{scale\_factor}/tp) \times (1-mv(i) \times tb)-1) >> \text{shift\_len})$$

else, $$MV_F(i)=((\text{scale\_factor}/tp) \times (1+mv(i) \times tb)-1) >> \text{shift\_len})$$

calculating a backward motion vector $MV_B$ of the current block by using the following formulas:

if $mv(i)<0$:

$$MV_B(i)=((\text{scale\_factor}/tp) \times (1-mv(i) \times td)-1) >> \text{shift\_len}$$

else, $$MV_B(i)=-(((\text{scale\_factor}/tp) \times (1+mv(i) \times td)-1) >> \text{shift\_len})$$

where the scale_factor value is a decimal fraction amplification factor; the shift_len denotes times for right shift and shift_len is a natural number; $MV_F$ and $MV_B$ denote a forward motion vector and a backward motion vector corresponding to the current block; tb is a distance in time domain between a current picture and a forward reference picture; td denotes a distance in time domain between a forward reference picture and a backward reference picture; tp is a distance in time domain between a current picture and a backward reference picture; MV(i) denotes a horizontal component or vertical component of motion vector of the corresponding part of the backward reference picture with respect to a forward reference frame; MV(x,y)×(MV(x), MV(y)) is a two-dimensional vector, of which the corresponding components are MV(x),MV(y); MV(i)denotes MV(x) or MV(y); and a/b denotes an integer of a quotient of a and b towards zero, a is the dividend of $MV_F(i)$ or $MV_B(i)$, b is the divisor of $MV_F(i)$ or $MV_B(i)$;
   (3) the forward and backward image block pointed by the motion vector obtained from step (2) acting as a reference image block of the current image block.

2. The method used by the hardware apparatus for determining a reference image block in direct coding mode as claimed in claim 1, wherein in step (2), the following method can be used to obtain a motion vector MV(x,y) for direct coding a current B frame image block:

calculating a forward motion vector $MV_F$ of the current block by using the following formulas:

assuming scale_factor=$2^{shift\_len}$, if $mv(i)<0$:

$MV_F(i)=-(((\text{scale\_factor}/tp)-(tb\times\text{scale\_factor}/tp)\times mv(i)-1)>>\text{shift\_len})$ else, $MV_F(i)=((\text{scale\_factor}/tp)+(tb\times\text{scale\_factor}/tp)\times mv(i)-1)>>\text{shift\_len})$ calculating a backward motion vector $MV_B$ of the current block by using the following formulas:

if $mv(i)<0$:

$MV_B(i)=((\text{scale\_factor}/tp)+(td\times\text{scale\_factor}/tp)\times mv(i)-1)>>\text{shift\_len}$ else, $MV_B(i)=-(((\text{scale\_factor}/tp)+(td\times\text{scale\_factor}/tp)\times mv(i)-1)>>\text{shift\_len})$ where the scale_factor value is a decimal fraction amplification factor; the shift_len denotes times for right shift; $MV_F$ and $MV_B$ denote a forward motion vector and a backward motion vector corresponding to the current block; tb is a distance in time domain between a current picture and a forward reference picture; td denotes a distance in time domain between a forward reference picture and a backward reference picture; MV denotes a motion vector of the corresponding part of the backward reference picture with respect to a forward reference frame; MV(x,y)=(MV(x) , MV(y)) is two-dimensional vector, of which the corresponding components are MV(x),MV(y); MV(i)denotes MV(x) or MV(y); and a/b denotes integering a quotient of a and b towards zero.

3. The method used by the hardware apparatus for determining a reference image block in direct coding mode as claimed in claim 1, wherein in step (2), calculating a forward motion vector $MV_F$ of the current block by using the following formulas:

assuming scale_factor $=2^{shift\_len}$, $td=tp-tb$;

if $mv(i)<0$:

$MV_F(i)=-(((\text{scale\_factor}/tp)\times(1-mv(i)\times tb))>>\text{shift\_len})$ else, $MV_F(i)=((\text{scale\_factor}/tp)\times(1+mv(i)\times tb))>>\text{shift\_len}$ calculating a backward motion vector $MV_B$ of the current block by using the following formulas:

if $mv(i)<0$:

$MV_B(i)=((\text{scale\_factor}/tp)\times(1-mv(i)\times td))>>\text{shift\_len}$ else, $MV_B(i)=-(((\text{scale\_factor}/tp)\times(1+mv(i)\times td))>>\text{shift\_len})$.

4. The method used by the hardware apparatus for determining a reference image block in direct coding mode as claimed in claim 1, wherein in step (2), calculating a forward motion vector $MV_F$ of the current block by using the following formulas:

assuming scale_factor $=2^{shift\_len}$, if $mv(i)<0$:

$MV_F(i)=-(((\text{scale\_factor}/tp)-(tb\times\text{scale\_factor}/tp)\times mv(i))>>\text{shift\_len})$;

or else, $MV_F(i)=((\text{scale\_factor}/tp)+(tb\times\text{scale\_factor}/tp)\times mv(i))>>\text{shift\_len}$;

calculating a backward motion vector $MV_B$ of the current block by using the following formulas:

if $mv(i)<0$:

$MV_B(i)=((\text{scale\_factor}/tp)-(td\times\text{scale\_factor}/tp)\times mv(i))>>\text{shift\_len}$;

or else, $MV_B(i)=-(((\text{scale\_factor}/tp)+(td\times\text{scale\_factor}/tp)\times mv(i))>>\text{shift\_len})$.

5. The method used by the hardware apparatus for determining a reference image block in direct coding mode as claimed in claim 2, wherein scale_factor / tp ,tb×scale_factor/ tp , td/tp×scale_factor parameters are pre-calculated prior to the step (1), and a calculated result is stored in a table, which is directly picked up by the calculation in step (2).

6. The method used by the hardware apparatus for determining a reference image block in direct coding mode as claimed in claim 1, wherein said shift_len in step (2) is a natural number larger than or equal to 8.

7. The method used by the hardware apparatus for determining a reference image block in direct coding mode as claimed in claim 1, wherein said obtaining a motion vector of the corresponding block of the backward reference frame comprises:

selecting a macro block in a backward reference P frame with the same position as a macro block to be coded in B frame as a corresponding macro block, and obtaining a motion vector of the macro block of the P frame.

* * * * *